(12) United States Patent
Giammarinaro, Jr.

(10) Patent No.: US 8,254,024 B2
(45) Date of Patent: Aug. 28, 2012

(54) INFLATABLE DISPLAY SCREEN

(76) Inventor: Richard Giammarinaro, Jr., Fallbrook, CA (US)

( * ) Notice: Subject to any disclaimer, the term of this patent is extended or adjusted under 35 U.S.C. 154(b) by 0 days.

(21) Appl. No.: 13/159,673

(22) Filed: Jun. 14, 2011

(65) Prior Publication Data

US 2011/0304908 A1    Dec. 15, 2011

Related U.S. Application Data

(60) Provisional application No. 61/354,603, filed on Jun. 14, 2010.

(51) Int. Cl.
*G03B 21/58*  (2006.01)
(52) U.S. Cl. .................... 359/450; 359/443; 359/460
(58) Field of Classification Search .............. 353/70; 359/450, 460
See application file for complete search history.

(56) References Cited

U.S. PATENT DOCUMENTS

| | | | | |
|---|---|---|---|---|
| 4,022,522 A * | 5/1977 | Rain | | 359/443 |
| 4,164,829 A * | 8/1979 | Sadler | | 52/2.14 |
| 4,323,301 A * | 4/1982 | Spector | | 359/443 |
| 4,339,175 A * | 7/1982 | Astero | | 359/443 |
| 4,369,591 A * | 1/1983 | Vicino | | 40/610 |
| 4,802,734 A * | 2/1989 | Walter | | 359/443 |
| 5,617,662 A * | 4/1997 | Hwang | | 40/736 |
| 6,668,475 B2 * | 12/2003 | Carolan | | 40/610 |
| 6,874,263 B2 * | 4/2005 | Ohmuku | | 40/590 |
| 7,114,276 B2 * | 10/2006 | Scherba | | 40/610 |
| 7,181,877 B2 * | 2/2007 | Quade | | 40/610 |
| D543,229 S * | 5/2007 | Hochendoner | | D16/241 |
| D554,175 S * | 10/2007 | Wiener | | D16/241 |
| 7,397,603 B2 * | 7/2008 | Peterson et al. | | 359/443 |
| 7,446,937 B2 * | 11/2008 | Poretskin | | 359/443 |
| 7,490,426 B2 * | 2/2009 | Scarberry | | 40/610 |
| D593,591 S * | 6/2009 | Hochendoner et al. | | D16/241 |
| 7,791,799 B1 * | 9/2010 | Lejeune et al. | | 359/443 |
| 7,920,326 B2 * | 4/2011 | Clawson et al. | | 359/443 |
| 7,942,533 B2 * | 5/2011 | Ganzevoort | | 353/79 |
| D654,132 S * | 2/2012 | Giammarinaro, Jr. | | D21/803 |
| D654,945 S * | 2/2012 | Giammarinaro, Jr. | | D16/241 |
| 2005/0068618 A1 * | 3/2005 | Poretskin | | 359/443 |
| 2008/0231815 A1 * | 9/2008 | Ganzevoort | | 353/79 |

\* cited by examiner

*Primary Examiner* — Clayton E Laballe
*Assistant Examiner* — Kevin Butler (57) ABSTRACT

An inflatable display screen has a front wall incorporating a rectangular display screen area, and a plurality of inflatable struts surrounding the screen area and extending rearwardly from the front wall to support the screen in an upright condition. A lower horizontal strut extends across the lower end of the front wall and projects forwards from the display screen area. Lower side struts extend rearwards to a lower horizontal strut extending across the rear end of the structure. A pair of rearwardly arched support struts extends from the upper corners of the front wall rearwards and downwards to the rear corners of the structure at corner junctions between the arched struts, lower side struts and the lower horizontal strut.

22 Claims, 10 Drawing Sheets

INFLATABLE DISPLAY SCREEN

RELATED APPLICATION

The present application claims the benefit of co-pending U.S. provisional patent application No. 61/354,603 filed Jun. 14, 2010, which is incorporated herein by reference in its entirety.

BACKGROUND

1. Field of the Invention

The present invention relates generally to inflatable, portable display screens suitable for outdoor use when viewing projected or video images, and is particularly concerned with inflatable projection screens.

2. Related Art

Inflatable mattress-like projection screens for outdoor use have been in use for some time. The screens are typically tethered in an upright position and may have rear supports. One such screen is described in U.S. Pat. No. 7,446,937. One problem with existing outdoor inflatable display screens is that they tend to buckle or lift up from the ground in high wind conditions.

There is therefore a need for an outdoor projection screen which can be used in high wind conditions.

SUMMARY

Embodiments described herein provide for an inflatable display screen suitable for outdoor use which has improved wind resistance.

According to one embodiment, an inflatable display screen comprises an inflatable structure having a front face incorporating a rectangular display screen area, opposite sides extending rearward from the front face, a rear end, a lower substantially flat ground engaging face, and an upper end. The structure includes a plurality of inflatable struts with interconnected chambers surrounding and supporting the screen area. An inlet is adapted for connection to an air blower device to inflate the structure. In one embodiment, the inflatable struts comprise a pair of upright struts on opposite sides of the display screen area, a lower horizontal strut extending across the lower end of the front face and projecting forwards from the display screen area, an upper horizontal strut above the screen area, a pair of horizontal, rearwardly projecting side struts along the lower end of the opposite sides of the structure, a rear horizontal strut extending between the rear ends of the opposite lower side struts, and a pair of rearwardly arched support struts extending from the upper corners of the front face rearwards and curving downwards to meet the junction between the rear side struts and rear horizontal strut at the rear corners.

The opposite sides of the structure may be covered by cover sheets which may be permanently attached or removable. The structure may include fasteners for fastening a rear cover of opaque material between the rearwardly arched support struts to completely enclose the rear area behind the screen area, and the rear cover may be removed for rear projection purposes.

In an alternative embodiment, an inflatable screen structure of smaller dimensions may be provided primarily for home indoor or outdoor use. The screen structure has a front wall incorporating an upright screen area and a lower, forwardly extending portion below the screen area, opposite side walls, a lower wall, and an arcuate rear wall extending from the upper edge of the front wall down to the rear end of the lower wall. The rear wall has an opening into an internal cavity extending to the rear of the screen area. The walls may all be formed by a plurality of inflatable internal chambers.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for an inflatable display or projection screen.

After reading this description it will become apparent to one skilled in the art how to implement the invention in various alternative embodiments and alternative applications. However, although various embodiments of the present invention will be described herein, it is understood that these embodiments are presented by way of example only, and not limitation.

FIGS. 1 to 7 illustrate a first embodiment of an inflatable screen structure 10 in an inflated condition. When inflated, the structure 10 has a front face 12, opposite sides 14, a lower wall 15, and an arcuate rear face 16 extending from the top of the wall down to the rear end of the lower wall 15. The front face 12 includes a built-in rectangular, white projection screen area 18. The screen area may be formed integrally with the material of the structure, or may be a separate sheet of screen material secured to the surrounding structure by bonding, adhesive, stitching or the like.

Figure 1:
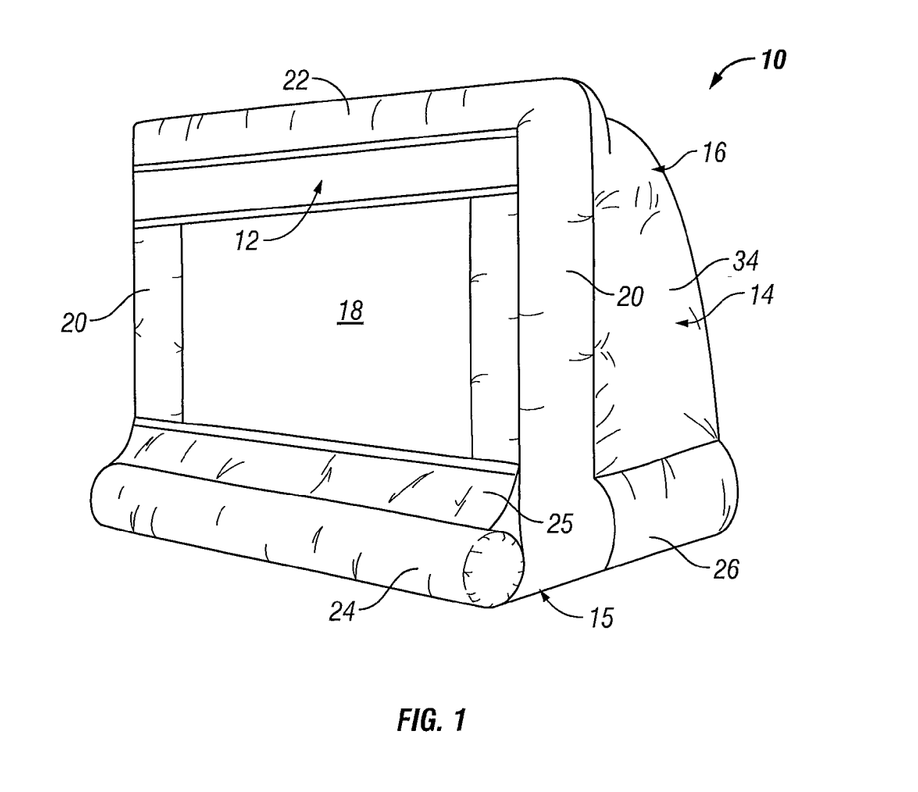
FIG. 1 is a front perspective view of a first embodiment of an inflatable display or projection screen in an inflated condition.
Figure 3:
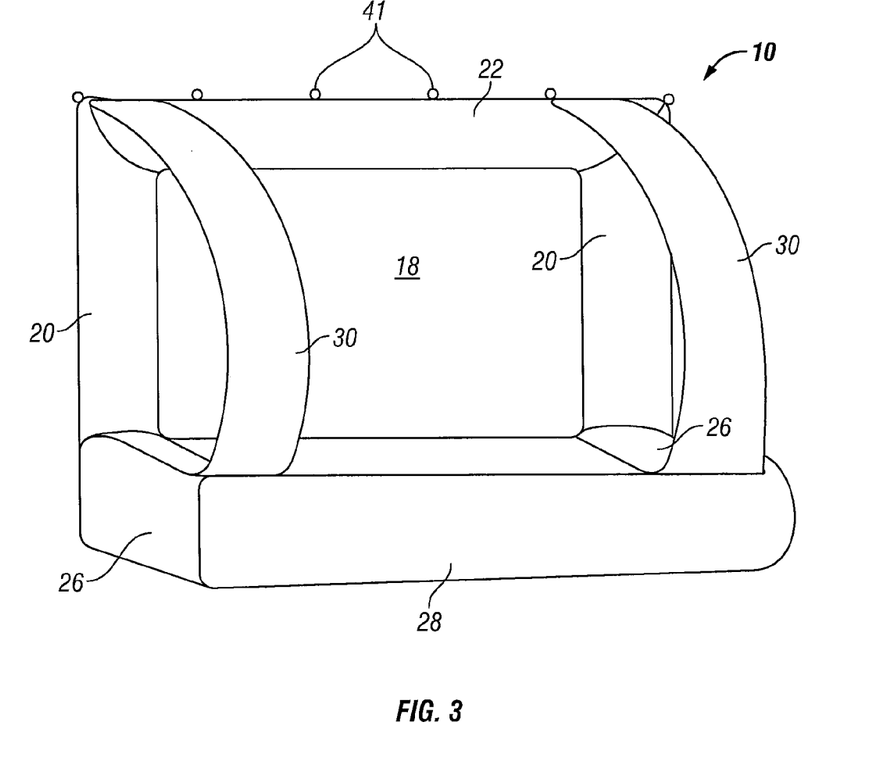
FIG. 3 is a rear perspective view similar to FIG. 2 but with the side cover sheets removed.
Figure 4:
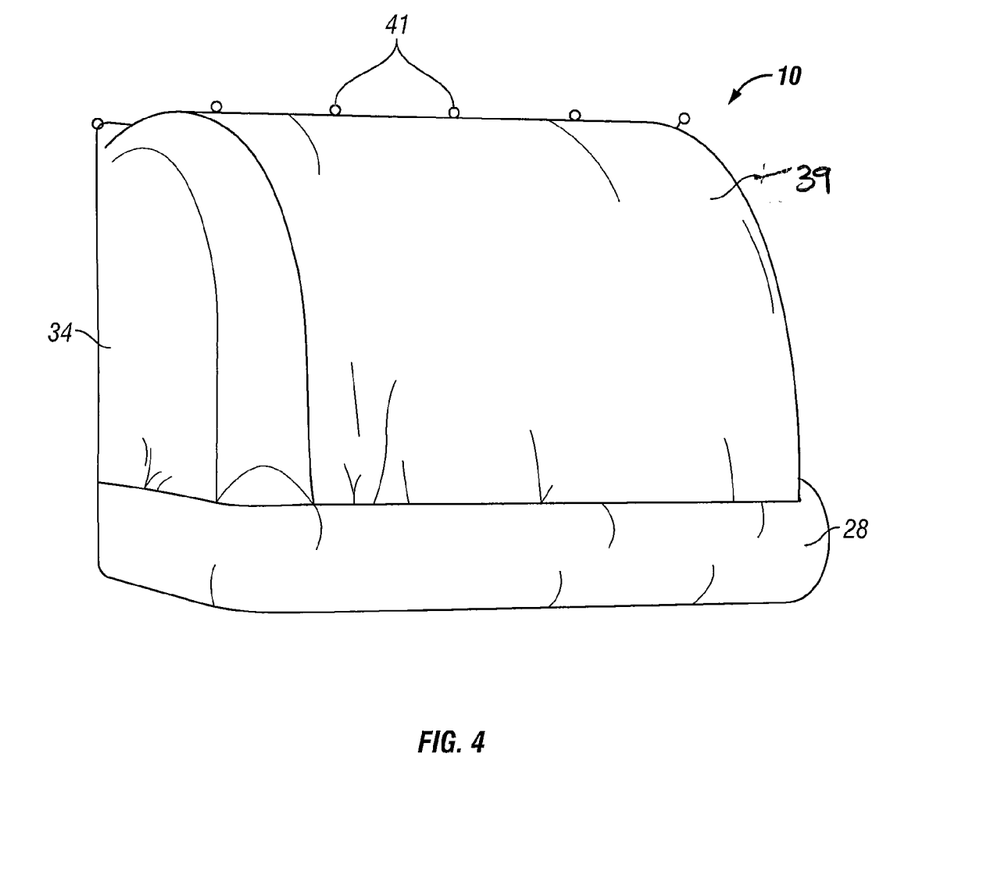
FIG. 4 is a rear perspective view similar to FIGS. 1 and 2 illustrating side and rear cover sheets in place to enclose the space behind the screen area.
Figure 5:
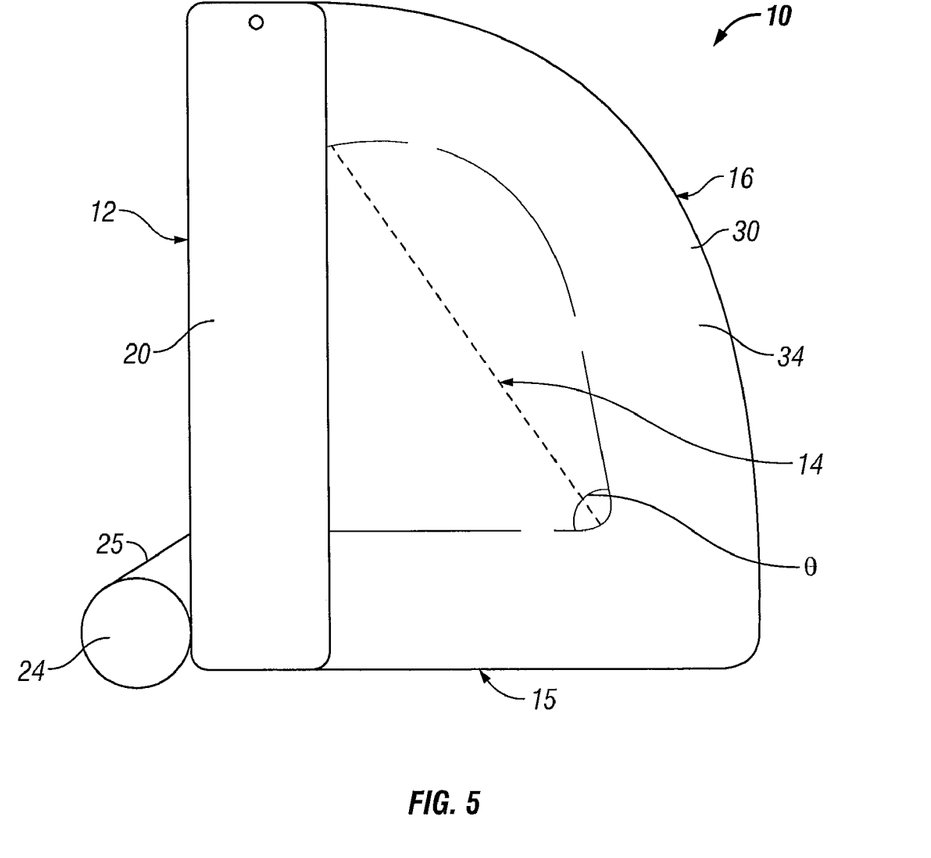
FIG. 5 is a side elevation view of the screen of FIGS. 1 to 4

The structure 10 comprises a plurality of generally tubular inflatable support struts with interconnected internal chambers, including a pair of upright side struts 20 on opposite sides of the screen, an upper horizontal strut 22 extending along the top of the screen area, and a lower horizontal front strut 24 which extends across the lower end of the front face and projects forwards from the screen area as best seen in FIGS. 1 and 5. A flap 25 connects lower front strut 24 to the remainder of the front face and acts as an aerodynamic wind-directing baffle. The opposite sides 14 of the structure include a pair of rearwardly extending horizontal side struts 26 extending from the lower ends of the respective upright struts 20. A rear horizontal strut 28 extends between the rear ends of the lower horizontal side struts 26 to define a rectangular base. Each side of the structure also includes a pair of rearwardly arched side support struts 30 which extend from the respective upper corners of the front of the structure and curve downwardly to meet the rear ends of the lower side struts at the junction between the respective horizontal side struts and rear horizontal strut at the rear corners of the structure, as best illustrated in FIG. 3. As illustrated in FIG. 5, the arched struts 30 extend substantially horizontally rearward at their upper ends, and then curve downwards into lower portions which meet the lower side struts at an angle of around 60 to 85 degrees to the horizontal direction. The inflatable struts are interconnected by bonding, adhesive, or lines of stitching, and the overall structure may be fabricated of any suitable strong, waterproof material such as plastic vinyl or the like. In one embodiment, polyvinyl chloride (PVC) fabric of 5 mil thickness was used. The hollow internal chambers of the respective struts are interconnected for gas flow throughout the structure and have internal strengthening baffles with openings for air or other gas flow through the struts, similar to the internal baffle structure used in inflatable bounce houses.

Figure 2:
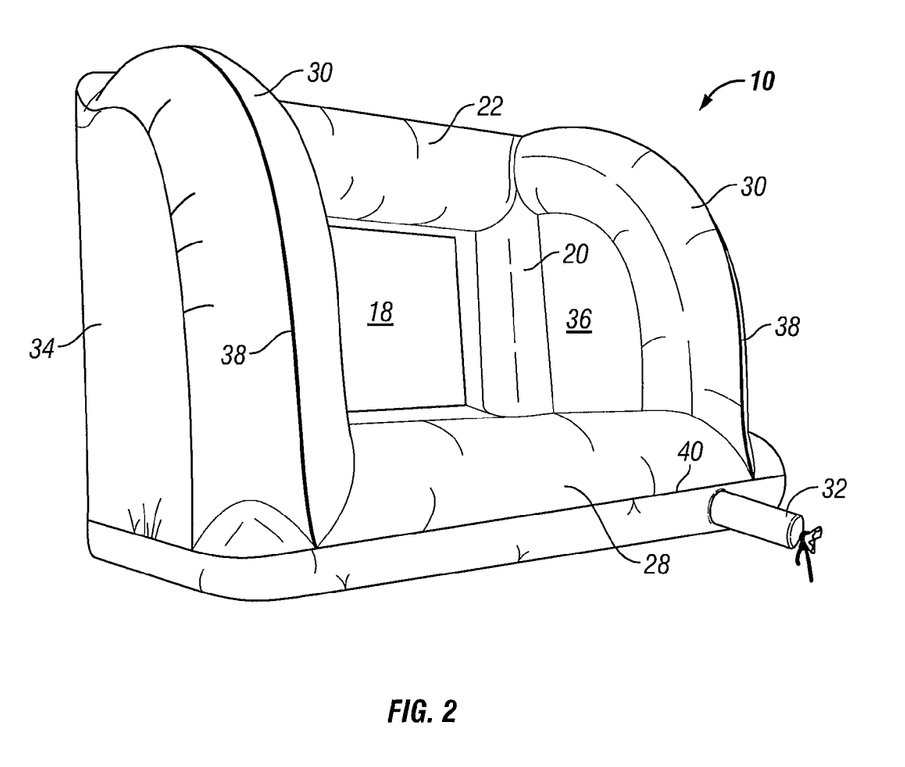
FIG. 2 is a rear perspective view of the screen of FIG. 1.

An inlet tube 32 for connection to an air blower or the like (not illustrated) is provided in rear strut 28, but may be provided elsewhere in the structure if desired. The opposite sides 14 of the inflated structure are covered by cover sheets 34 which extend over each side of the structure to cover the openings 36 between the struts 20, 26 and 30 to improve the aerodynamic properties of the structure and reduce wind lift. The cover sheets may be permanently secured in position or may be removable. A removable cover sheet 39 (see FIG. 4) is also provided to cover the open back of the structure if rear projection is not desired. The cover sheet 39 may be releasably secured to the rear of the structure by any suitable fastener mechanism such as snap fasteners, zippers or the like, and in the illustrated embodiment is conveniently attached by mating strips of hook and loop fastener material such as Velcro®. As illustrated in FIG. 2, strips 38 of fastener material extend downwardly from the top of the rear face of each arched strut towards the lower end of the structure, and a horizontal strip 40 of fastener material extends across the rear horizontal strut 28 approximately along the center of its rear face, meeting the lower ends of the strips 40. Corresponding strips of mateable fastener material (not visible in the drawings) are provided on the inner face of the cover sheet 39. One or more exhaust openings closed by zippers or the like may be provided for deflation purposes when the screen assembly is to be collapsed for transportation or storage. In the illustrated embodiment, an exhaust opening closed by a zipper is provided along the top of upper strut 22, and may be provided in other locations in alternative embodiments.

Rings 41 for tether lines are also provided across the top of the inflatable structure, as indicated in FIGS. 3 to 6, and rings to receive pegs may also be provided around the lower periphery of the structure. Tether lines may be used in high wind conditions for additional stability. An air release zipper (not visible in the drawings) may also be provided across the top of upper inflatable chamber or strut 22.

Figure 6:
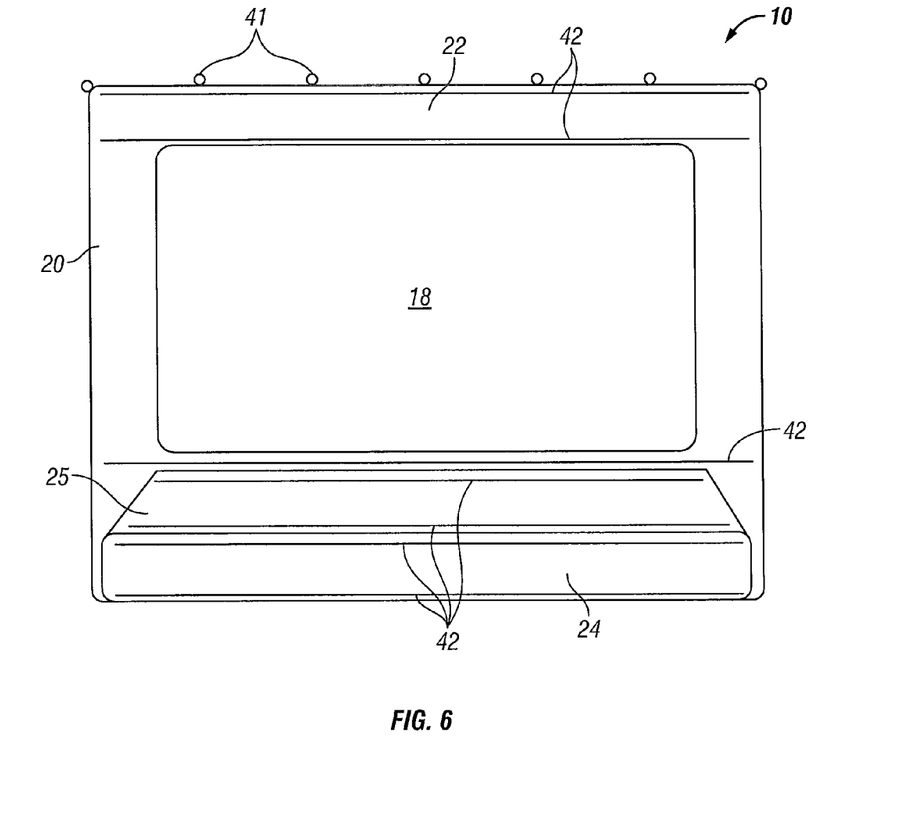
FIG. 6 is a front elevation view of the screen illustrating a first screen size option.

As illustrated in FIG. 6, additional parallel strips 42 of fastener material are also provided across the front face 12 of the structure above and below the screen area 18. These may be used for releasably attaching advertising banners, event sponsor information, or the like, and may also be used to adjust the screen size. The screen size illustrated in FIG. 6 is a 20 foot by 12 foot screen to provide a 16:9 aspect ratio.

Figure 7:
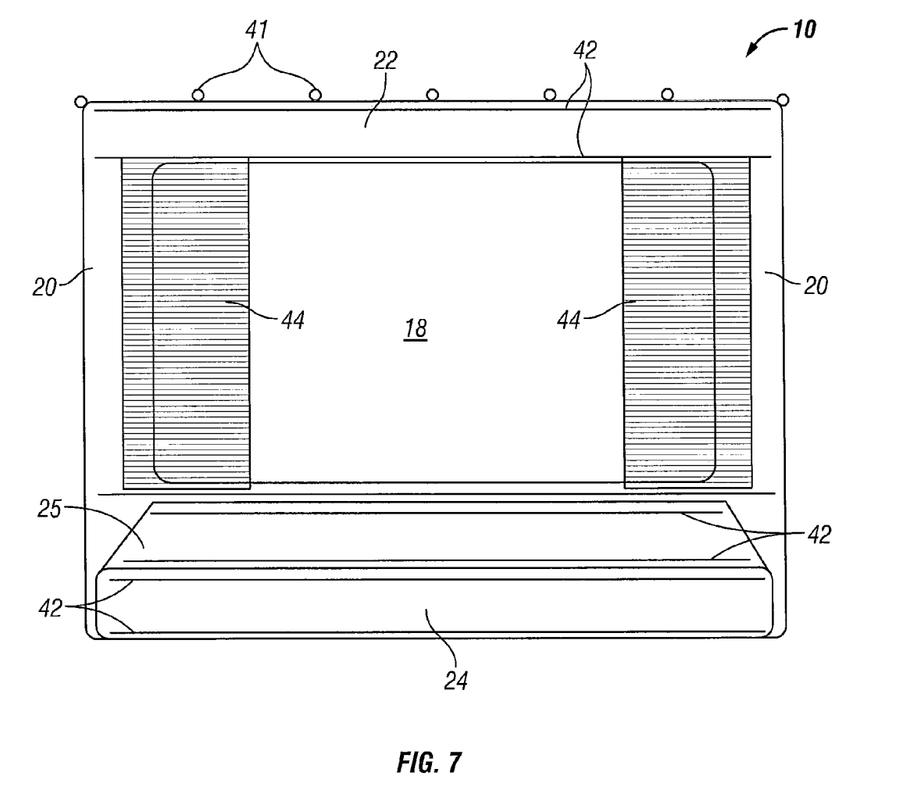
FIG. 7 is a front elevation view similar to FIG. 6 illustrating an alternative screen size option.

Black panels 44 as illustrated in FIG. 7 may be attached between upper and lower fastener strips 42 at opposite ends of the screen to convert it from the 16:9 wide screen aspect ratio of FIG. 6 to a 4:3 TV screen (16 foot by 12 foot) aspect ratio as illustrated in FIG. 7, depending on the format of the movie or other image to be displayed. Each of the panels 44 is two feet wide and greater than twelve feet in height, and has strips of fastener material mateable with strips 42 on its inner face adjacent the upper and lower ends of the panel. Although the screen size adjustment panels are attached using mating Velcro® strips in the illustrated embodiment, they may be attached in a different manner in alternative embodiments, for example they may be slidably mounted or attached at an upper end and rolled up when not in use, then unrolled and pulled down when needed.

The dimensions of the rear inflatable stabilizing struts, particularly the rear arch supports or struts 30, are such that the overall inflated structure is quite resistant to buckling of the screen in high wind conditions. In practice, it has been found that these struts tend to pop the screen back up into an upright condition even if it does start to buckle. Inflatable projection screens may be provided with screens 18 of the following sizes, with the larger dimension comprising screen width: 6×3.5 feet, 8×4.5 feet, 10×5.5 feet, 12×7 feet, 16×9 feet, 20×10.5 feet, 20×12 feet, 25×14 feet, 30×17 feet, 40×22 feet, and 60×34 feet. A range of inflatable projection screens as illustrated in FIGS. 1 to 7 may be made in each of these screen sizes. Alternatively, a reduced set of inflatable screens may include side panels for adjustment of a single screen between two or more of the listed screen sizes, such as a single screen adjustable from 20×12 feet to 16×12 feet, as described above. In one embodiment, the diameter of arch supports 30 for screens of the following maximum width dimensions was as follows:

Screen width 6 feet to 10 feet—Arch support strut diameter 2.5 feet;

Screen width 12 feet to 16 feet—Arch support strut diameter 3.5 feet;

Screen width 20 feet to 30 feet—Arch support strut diameter 5 feet;

Screen width 40 feet to 60 feet—Arch support strut diameter 6.5 feet.

The other inflatable struts or supports may be of similar dimensions to the arcuate rear support struts 30. The smaller screen sizes (6 feet and 8 feet) are for home use or small venues. Other sizes may be used in alternative embodiments.

The structure described above for a 20×12 feet viewing screen may have a footprint at its lower end of the order of around 30 feet across the front and 18 feet along the sides. The overall height at the front of the structure may be of the order of 23 feet. These dimensions are scaled up or down as appropriate for larger or smaller screen sizes. For example, a 6×3.5 feet screen may have a width of around nine feet across the front, a height of around six or seven feet, and a length of around four or five feet along the sides. A 30×17 feet screen may have a width of around 45 feet, a height of around 30 to 34 feet, and a length of around 25 to 28 feet along the sides.

Another advantage of the structure as illustrated in FIGS. 1 to 7 is the overall streamlined surface which tends to direct wind or air flow up and over the top of the screen structure. In the past, inflated screen structures with completely flat front faces would tend to lift up due to wind flow between the ground and lower edge of the screen. The front inflated strut or bolster 24 of this embodiment resists lifting, together with the streamlined, angled flap which directs wind flow upwards. The inflatable projection screen 10 can be used effectively under higher wind conditions than prior tethered inflatable screens of simple mattress like shape.

Figure 8:
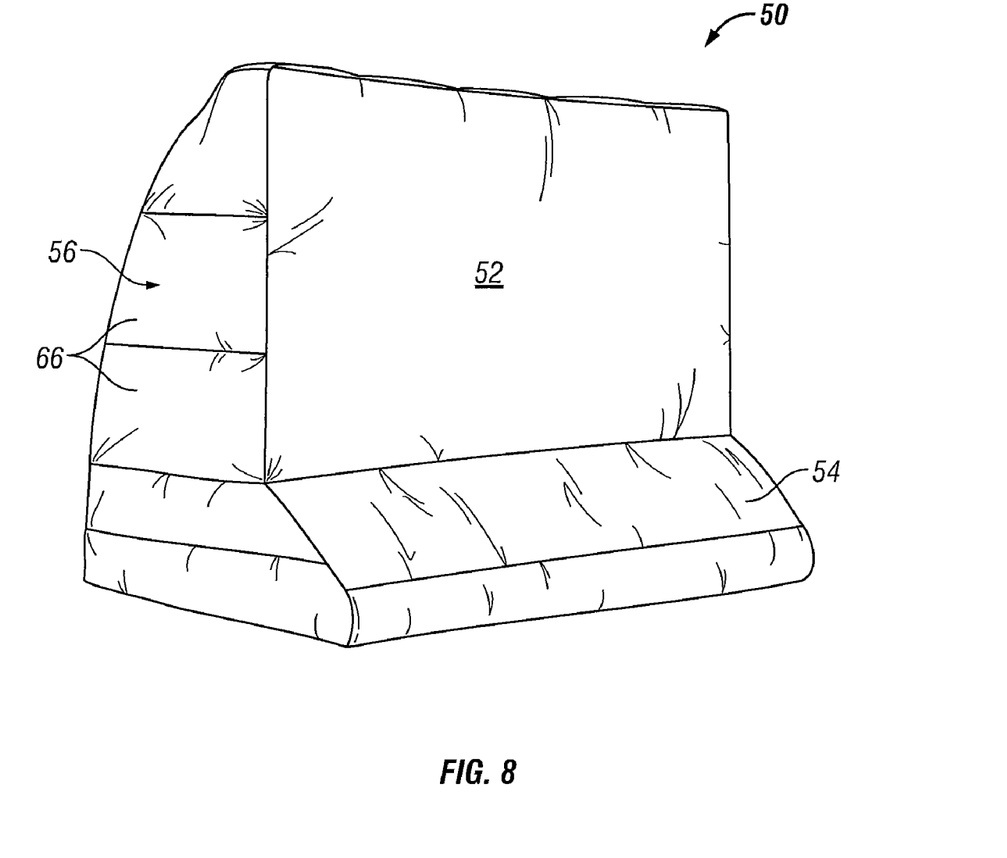
FIG. 8 is a front perspective view of a second embodiment of an inflatable display or projection screen in an inflated condition.
Figure 9:
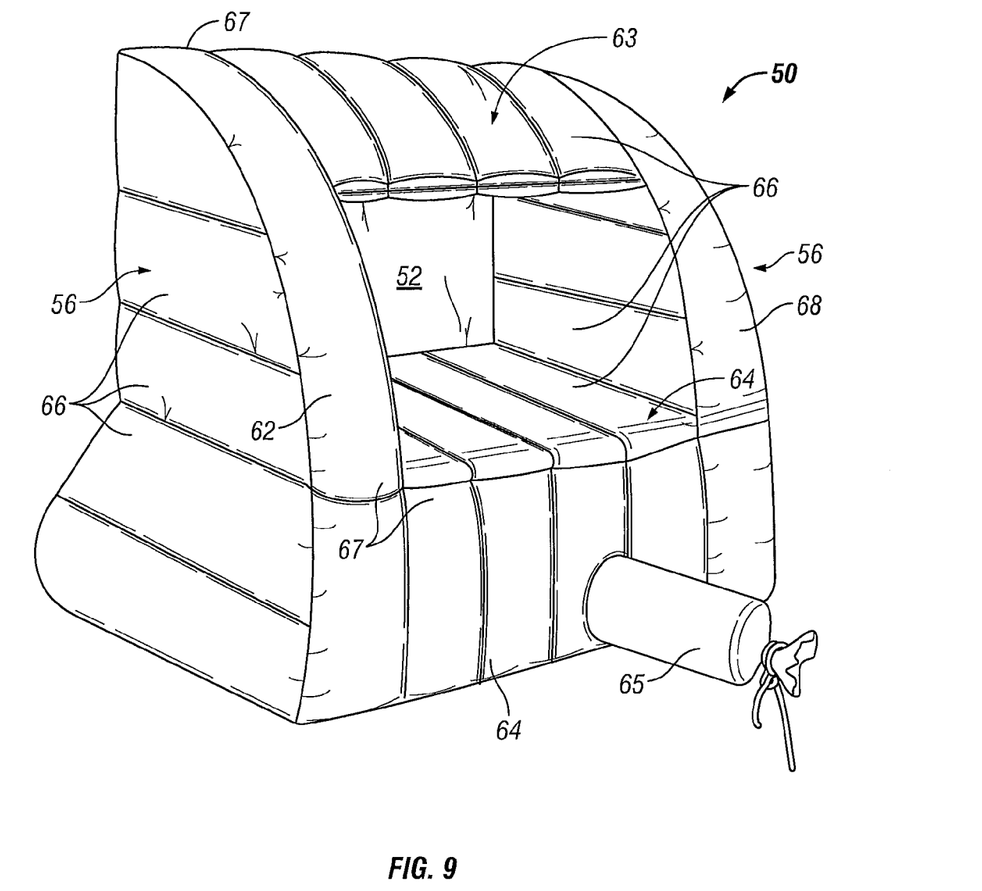
FIG. 9 is a rear elevation view of the screen of FIG. 8.
Figure 10:
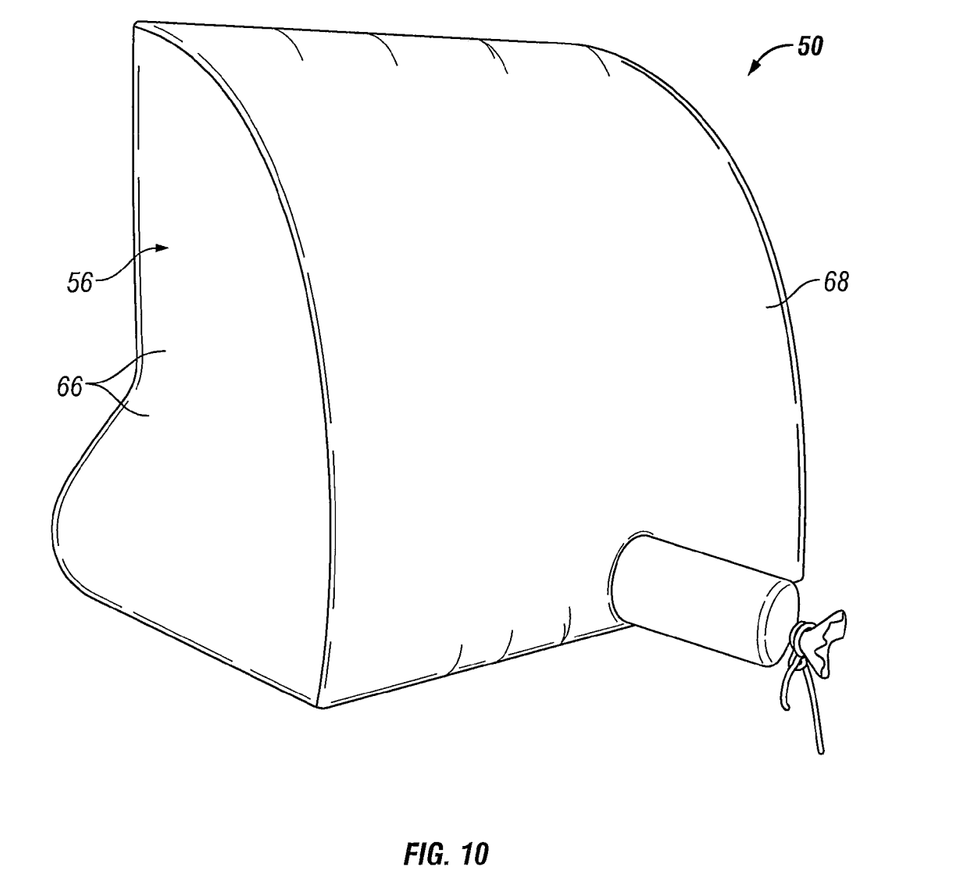
FIG. 10 is a rear elevation view similar to FIG. 9 illustrating a rear cover sheet in place covering the rear opening behind the screen area.

FIGS. 8 to 10 illustrate an inflatable projection screen 50 according to a second embodiment. The inflated screen 50 is of similar overall shape to the screen 10 of FIGS. 1 to 7, with a flat screen area 52, a forwardly inclined face 54 extending from the lower end of screen area 52 to the lower edge 55 of the structure, substantially flat side walls 56, with an arcuate rear shape. In one embodiment, the dimensions of screen 52 may be 6×3.5 feet or 8×4.5 feet, with an arcuate rear strut of 2.5 feet in diameter, and the screen structure 50 may be used for home use or small venues, either indoors or outdoors. As illustrated in FIG. 9, the screen structure is open at the rear and the side walls 56 are spaced inflatable walls with arcuate rear faces 62, a lower inflatable platform 64 extending between the side walls 60 up to rear wall or face 64, and an upper wall 63 extending between the side walls. A blower inlet 65 is provided in the rear wall. The inflatable structure may be constructed in a similar manner and using the same materials as the first embodiment. The interior of the structure is made up of plural, interconnected inflation chambers 66 which extend in a horizontal, front to rear direction, as illustrated in FIGS. 8 and 9, rather than in a vertical or horizontal side-to-side direction as in the first embodiment. Fastener strips 67 may be provided on the rear face for selective attachment of a rear cover sheet 68, and may also be provided on the front surface for screen size adjustment, as in the first embodiment.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

I claim:

1. An inflatable display screen, comprising:
    an inflatable body having a front wall incorporating a rectangular display screen area having an upper end, opposite sides, and a lower end, opposite side portions extending rearward from the front wall and a rear, ground engaging portion extending between the opposite side portions in an inflated condition of the body, the body having an open rear area behind the screen area and between the side portions;
    the body having a plurality of inflatable support struts having interconnected inflation chambers, the inflatable support struts defining the front wall, opposite side portions, struts and rear portion in the inflated condition of the body;
    each opposite side portion having a downwardly extending, arcuate rear face which extends rearward and downward from the front wall to a respective end of the rear portion of the body in the inflated condition of the body; and
    a removable rear cover of opaque material configured to extend from the upper portion of the front wall downward over the arcuate rear faces of the side portions to the rear portion of the body to enclose the open rear area of the body behind the screen area in the inflated condition of the body.

2. The display screen of claim 1, further comprising releasable fasteners on the rear faces of the side portions and on the rear portion of the body and corresponding mating fasteners on the rear cover configured for releasable attachment of the rear cover over the rear open area of the body.

3. An inflatable display screen, comprising:
    an inflatable body having a front wall incorporating a rectangular display screen area having an upper end, opposite sides, and a lower end, opposite side portions extending rearward from the front wall and a rear, ground engaging portion extending between the opposite side portions in an inflated condition of the body, the body having an open rear area behind the screen area and between the side portions;
    the body having a plurality of inflatable support struts having interconnected inflation chambers, the inflatable support struts defining the front wall, opposite side portions, struts and rear portion in the inflated condition of the body;
    each opposite side portion having a downwardly extending, arcuate rear face which extends rearward and downward from the front wall to a respective end of the rear portion of the body in the inflated condition of the body; and
    the front wall has a lower inflatable strut extending horizontally below the display screen area and spaced forward from the display screen area in the inflated condition of the body.

4. The display screen of claim 3, further comprising an inclined, wind directing front flap extending from the lower end of the screen area over the lower inflatable strut.

5. The display screen of claim 4, further comprising an advertising panel removably attachable over the inclined front flap.

6. The display screen of claim 3, further comprising plurality of spaced tether rings secured across at least the upper end of the front wall.

7. The display screen of claim 3, wherein the inflatable support struts defining the front wall in the inflated condition comprise first and second side struts on opposite sides of the display screen area, an upper front strut extending along the upper end of the screen area, and the lower inflatable strut extending across the lower end of the front wall below the screen area.

8. The display screen of claim 7, wherein the inflatable support struts defining the opposite side portions in the inflated condition comprise a pair of horizontal, rearwardly projecting lower side struts and a pair of rearwardly arched struts extending rearward from opposite ends of the upper front strut and curving downwards to meet the respective lower side struts, the arched struts having lower ends in communication with the lower side struts and forming the rear arcuate faces of the side portions.

9. The display screen of claim 8, wherein the inflatable support strut defining the rear portion of the inflatable body in the inflated condition comprises a rear strut extending between the lower side struts.

10. The display screen of claim 9, wherein the rear strut has a gas inlet tube configured for connection to a pump or blower for inflating the body.

11. The display screen of claim 8, further comprising side cover sheets of opaque material configured to cover openings between the lower side struts and rearwardly arched struts of the opposite side portions in the inflated condition of the body.

12. The display screen of claim 8, wherein the arched struts meet the lower side struts at an angle of between 60 and 85 degrees.

13. The display screen of claim 8, wherein the arched strut diameter is at least 2.5 feet.

14. The display screen of claim 8, wherein the arched strut diameter is in the range from 2.5 feet to 6.5 feet and the width of the display screen area is in the range from 6 feet to 60 feet.

15. The display screen of claim 8, wherein the arched strut diameter is approximately 2.5 feet and the width of the display screen area is in the range from 6 feet to 10 feet.

16. The display screen of claim 8, wherein the arched strut diameter is approximately 3.5 feet and the width of the display screen area is in the range from 12 feet to 16 feet.

17. The display screen of claim 8, wherein the arched strut diameter is approximately 5 feet and the width of the display screen area is in the range from 20 feet to 30 feet.

18. The display screen of claim 8, wherein the arched strut diameter is approximately 6.5 feet and the width of the display screen area is in the range from 40 feet to 60 feet.

19. An inflatable display screen, comprising:
   an inflatable body having a front wall incorporating a rectangular display screen area having an upper end, opposite sides, and a lower end, opposite side portions extending rearward from the front wall and a rear, ground engaging portion extending between the opposite side portions in an inflated condition of the body, the body having an open rear area behind the screen area and between the side portions;
   the body having a plurality of inflatable support struts having interconnected inflation chambers, the inflatable support struts defining the front wall, opposite side portions, struts and rear portion in the inflated condition of the body;
   each opposite side portion having a downwardly extending, arcuate rear face which extends rearward and downward from the front wall to a respective end of the rear portion of the body in the inflated condition of the body; and
   the body including an inflatable, ground engaging lower portion extending rearward from the screen area and including the rear portion.

20. The display screen of claim 19, wherein at least the side portions, lower portion and rear portion of the body each have a plurality of inflatable internal chambers which are interconnected for gas flow through the chambers, the body having a single inlet tube communicating with one of the chambers and configured for connection to a gas supply for inflating the body.

21. An inflatable display screen, comprising:
   an inflatable body having a front wall incorporating a rectangular display screen area having an upper end, opposite sides, and a lower end, opposite side portions extending rearward from the front wall and a rear, ground engaging portion extending between the opposite side portions in an inflated condition of the body, the body having an open rear area behind the screen area and between the side portions;
   the body having a plurality of inflatable support struts having interconnected inflation chambers, the inflatable support struts defining the front wall, opposite side portions, struts and rear portion in the inflated condition of the body;
   each opposite side portion having a downwardly extending, arcuate rear face which extends rearward and downward from the front wall to a respective end of the rear portion of the body in the inflated condition of the body; and
   a plurality of opaque, size adjustment panels configured for selective attachment over opposite sides of the screen area to change the screen size.

22. The display screen of claim 21, further comprising strips of mateable hook and loop fastener material secured to portions of the front wall above and below the screen area, and the side adjustment panels each have strips of mating hook and loop fastener material configured for releasable attachment to the fastener material strips above and below the screen area.

* * * * *